J. H. KELLER & D. F. LUSE.
Divider Attachment for Harvesters.
No. 125,198. Patented April 2, 1872.
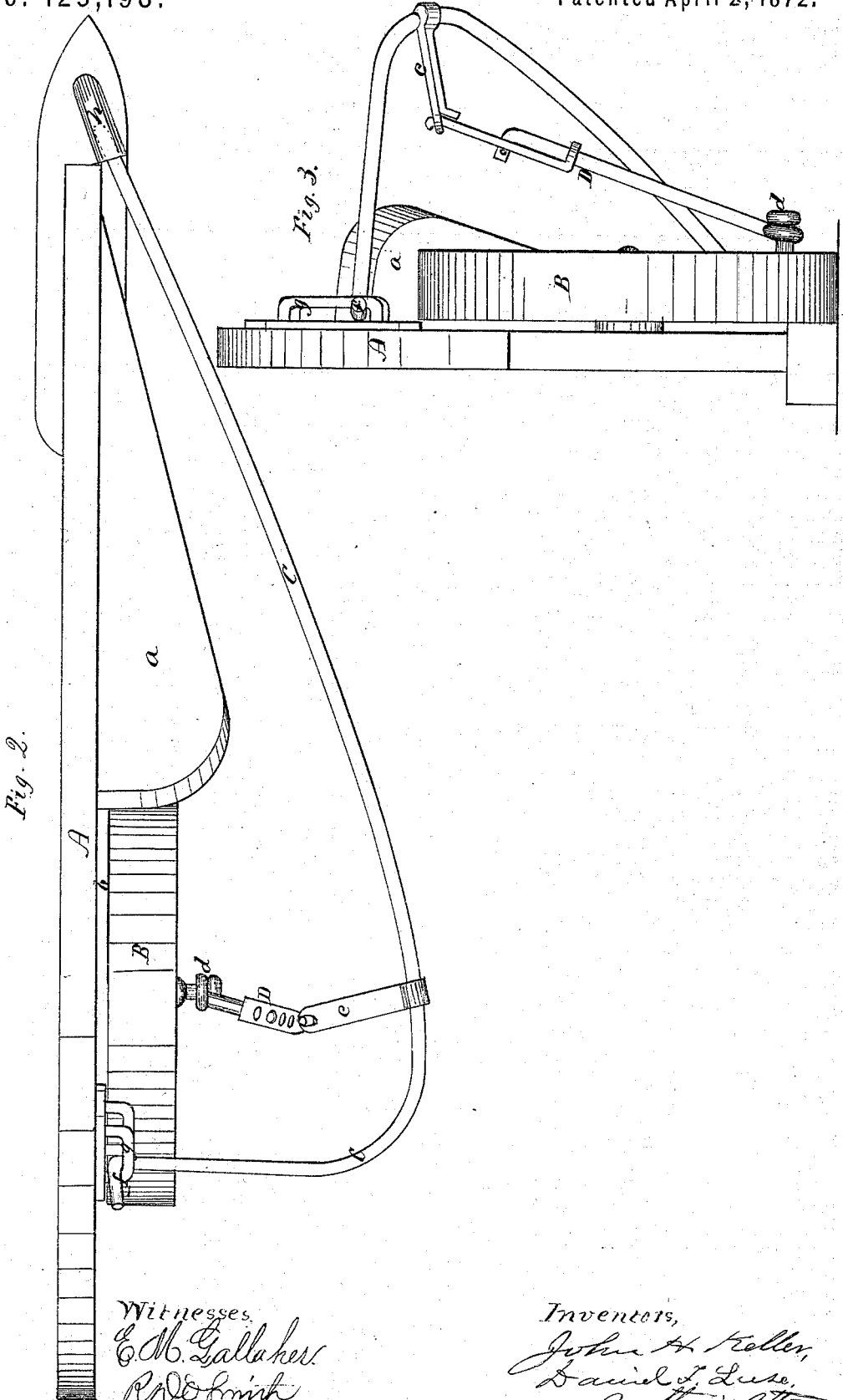
Witnesses
E. M. Gallaher
R. W. Smith
Inventors,
John H. Keller,
Daniel F. Luse,
By their Attorney
J. A. Brown 125,198

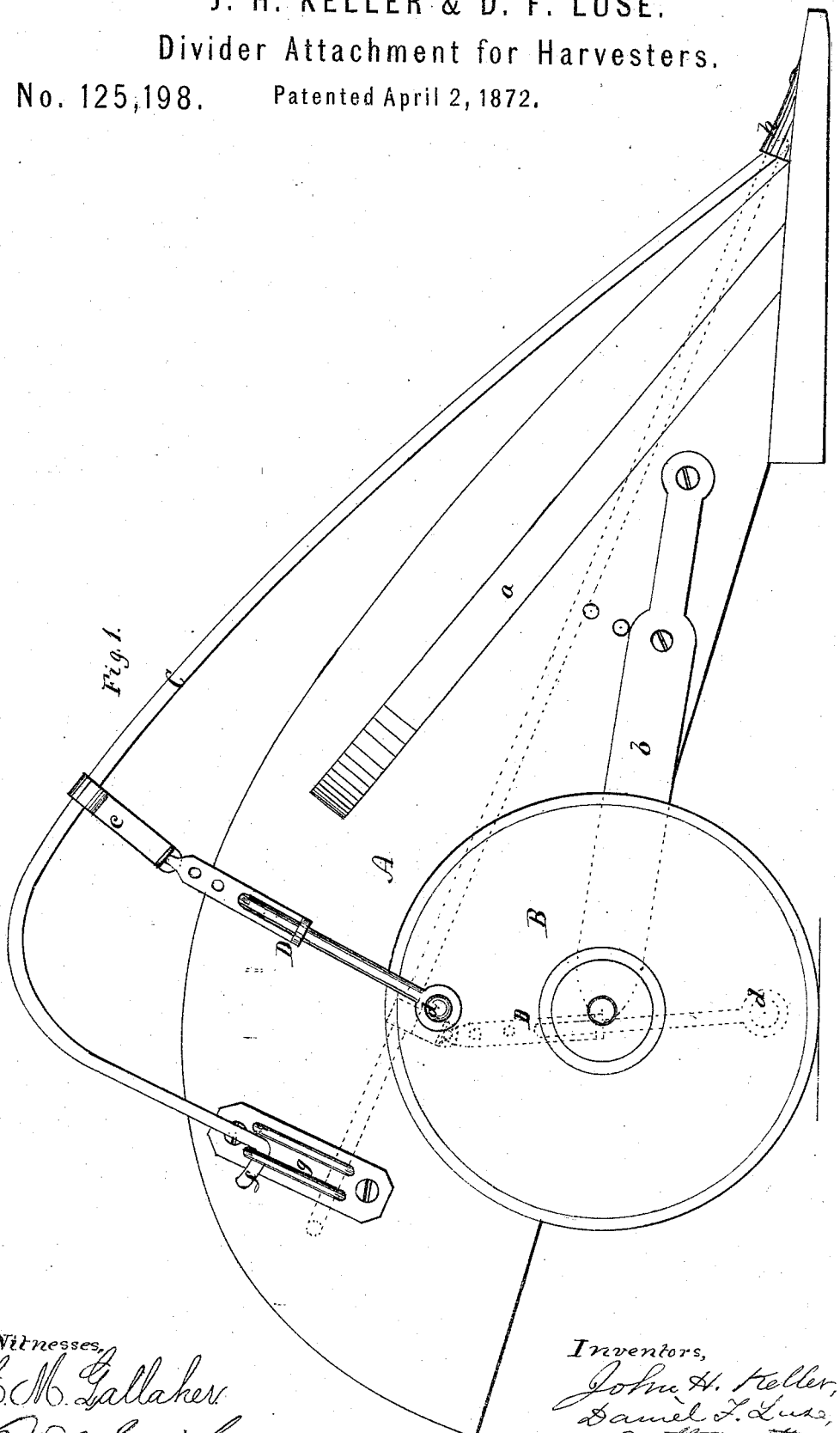

UNITED STATES PATENT OFFICE.

JOHN H. KELLER, OF BOALSBURG, AND DANIEL F. LUSE, OF CENTRE HALL, PENNSYLVANIA.

IMPROVEMENT IN DIVIDER ATTACHMENTS FOR HARVESTERS.

Specification forming part of Letters Patent No. 125,198, dated April 2, 1872.

*To all whom it may concern:*

Be it known that we, JOHN H. KELLER, of Boalsburg, and DANIEL F. LUSE, of Centre Hall, in the county of Centre and State of Pennsylvania, have invented a Gathering Attachment to the Divider-Board of Harvesters; and we do hereby declare that the following is a full and exact description thereof, reference being had to the accompanying drawing making part of this specification—

Figure 1 being a side view of the divide-board of a harvester provided with our gathering-attachment; Fig. 2, a top view of the same; Fig. 3, a rear view of the same.

Like letters designate corresponding parts in all of the figures.

The nature of our invention consists in an attachment to the divide-board of harvesters, having a reciprocating movement alternately up and down, as well as laterally, alternately from the standing grain inward toward the platform and outward again; and also in specific features of arrangement of the said operating attachment, as hereinafter specified.

Let A represent the divide-board of a harvester, and B the wheel which supports it and on which it runs. This wheel, by its revolutions, serves as the simplest and most convenient means of imparting the movements to the attachment C; the object of which is to separate the cut grain which falls upon the divide-board from the adjacent standing grain, and to throw it inward upon the platform of the harvester, thus completely gathering it with the rest of the cut grain and preventing any tangling of the same, even when the grain is lodged.

This moving or operating attachment we prefer to form of a simple rod, bent into the shape desired, (as represented,) or any equivalent effective form; the forward end being inserted in a bearing or socket, $h$, so as to have a sufficiently-free motion therein, while the rear end $f$ has an up-and-down sliding motion in a suitable guide or bearing, $g$, as shown, or of any equivalent construction.

The up-and-down and in-and-out movement of the attachment C is communicated to it from the revolving wheel B by means of a connecting-rod, D, extending from a crank-pin or connection, $d$, to the attachment. In order to keep the connecting-rod D as nearly in a vertical plane as possible, it is preferred to connect it with a projecting arm, $c$, secured to the attachment-rod, so as to point downward when the attachment is in a vertical position, as shown in Fig. 1, and to project laterally inward, toward the divide-board, when the attachment is in a horizontal position, as shown in Figs. 2 and 3. The length of the connecting-rod D is such as not only to swing the attachment from a horizontal to a vertical position, and back again, by the revolution of the wheel B, but also to slide the rear end $f$ up to the position shown by full lines in Fig. 1, when the attachment is raised to a vertical position, and to lower it to the position indicated by dotted lines in the same figure when the attachment is lowered to a horizontal position. The connecting-rod also is made adjustable in length, by means as shown, or otherwise, so as to adjust its action on the attachment to the varying height of the divide-board, as the bearing $b$ of the wheel B is adjusted up and down.

The advantage of the sliding up-and-down movement of the rear end of the attachment C is not only that the upward movement of the attachment is more rapid than it otherwise would be by the action of the wheel, but more especially because it causes the attachment to descend vertically by a quick and sudden motion before it swings outward to any considerable extent, thereby more effectually disengaging itself from the grain just previously thrown inward upon the platform, and obviating the liability of drawing any of it off again.

The movements of the gathering attachment C, though most easily, simply, and practically obtained from the revolutions of the wheel B, may be otherwise obtained. Thus, an additional driving-wheel might be employed for that purpose; or the motion might be communicated downward from the reel-shaft by band or chain and pulleys; or even it might be communicated from the driving-wheel or wheels of the machine across the platform or along the finger-bar.

What we claim as our invention, and desire to secure by Letters Patent, is—

1. A gathering device, C, having a reciprocating lateral and up-and-down movement, in combination with the divide-board A of a harvester, substantially as and for the purpose herein specified.

2. The combination of the gathering device C, having the movement described, divide-board A, and wheel B, substantially as and for the purpose herein specified.

3. The adjustable connecting-rod D in combination with the adjustable wheel B and gathering device C, for the purpose herein specified.

4. The gathering device C, attached to the divide-board of a harvester, when one end, $f$, has an up-and-down sliding movement in a bearing or guide, $g$, in addition to its swinging, lateral, and up-and-down movement, substantially as and for the purpose herein specified.

Specification signed by us October 27, 1871.

JOHN H. KELLER.
D. F. LUSE.

Witnesses:
J. D. MURRAY,
J. B. SALT.